United States Patent [19]

Moller

[11] Patent Number: 5,022,696
[45] Date of Patent: Jun. 11, 1991

[54] SIDEBOARD CONTROL MECHANISM

[76] Inventor: Jan Moller, Birkedalen 34, DK-2670 Greve Strand, Denmark

[21] Appl. No.: 382,643
[22] PCT Filed: Dec. 14, 1987
[86] PCT No.: PCT/DK87/00154
  § 371 Date: Oct. 16, 1989
  § 102(e) Date: Oct. 16, 1989
[87] PCT Pub. No.: WO89/05749
  PCT Pub. Date: Jun. 29, 1989
[51] Int. Cl.$^5$ ............................................. B62D 27/00
[52] U.S. Cl. .................................................. 296/36
[58] Field of Search ..................... 296/3, 32, 36, 181, 296/183

[56] References Cited

U.S. PATENT DOCUMENTS 1,740,755 12/1929 Wackerow ............................ 296/36
4,826,237 5/1989 Socha .................................... 296/36

FOREIGN PATENT DOCUMENTS 2417882 10/1975 Fed. Rep. of Germany ........ 296/36
20225 2/1978 Japan ..................................... 296/36
9330 1/1986 Japan ..................................... 296/183
1221011 3/1986 U.S.S.R. ................................ 296/36

Primary Examiner—Margaret A. Focarino
Assistant Examiner—Gary C. Hoge
Attorney, Agent, or Firm—Felfe & Lynch

[57] ABSTRACT

A sideboard pivotably mounted relative to a vehicle floor is pivoted between a closed position and an open position by a sole actuating mechanism fixed to the vehicle adjacent one end of the board. The sideboard is locked in the closed position at both ends by a locking mechanism which includes a transmission rod which transmits locking and unlocking movements from the end of the sideboard adjacent the actuating mechanism to the opposite end.

8 Claims, 7 Drawing Sheets

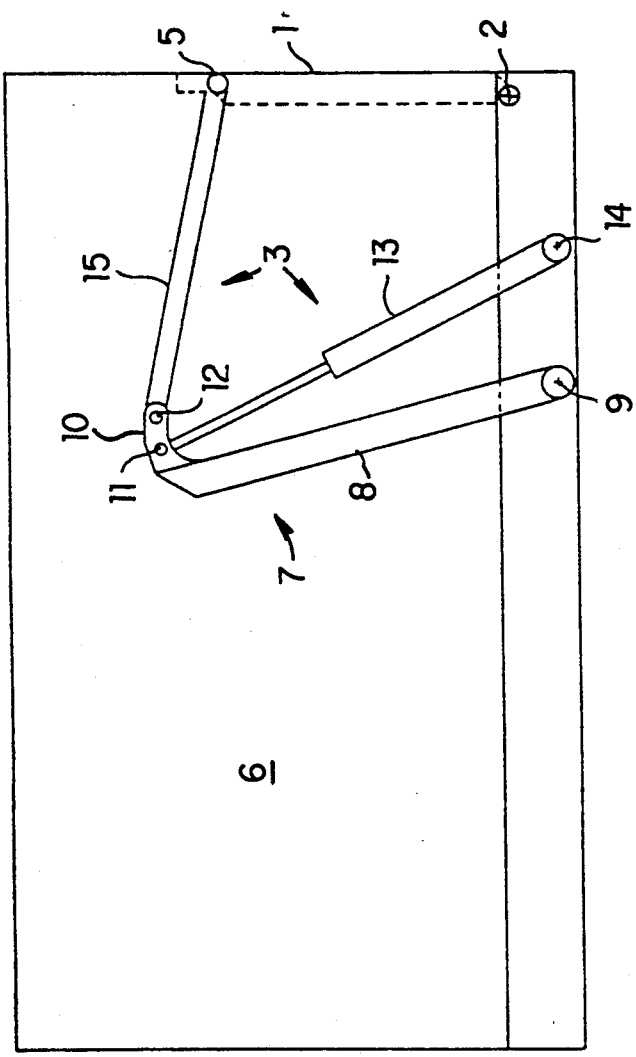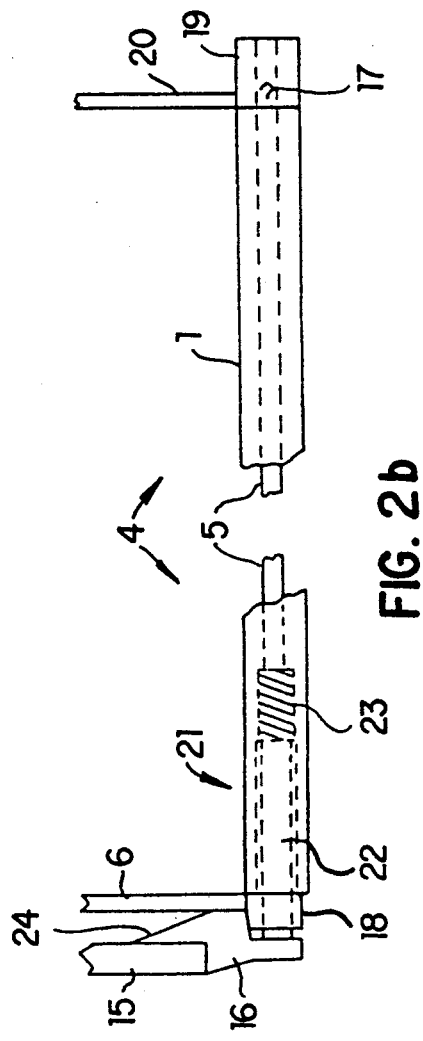
FIG. 2a
FIG. 2b

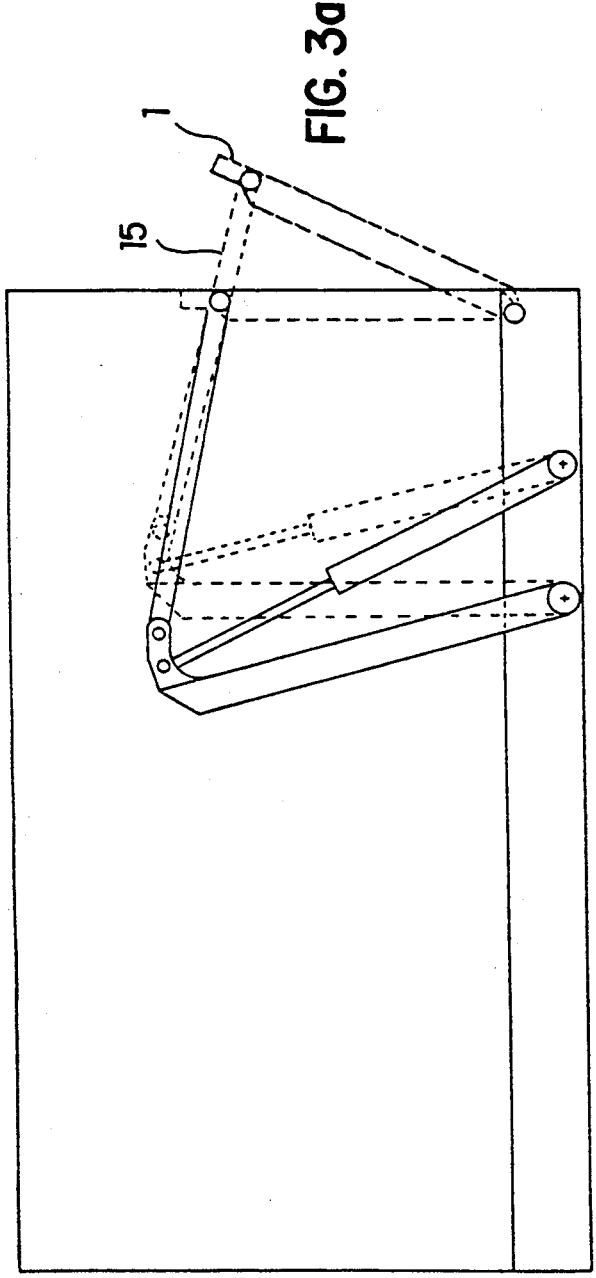
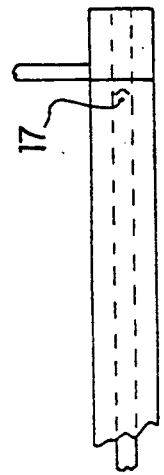
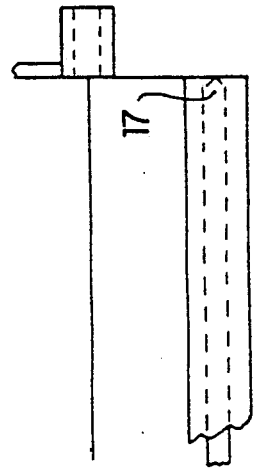
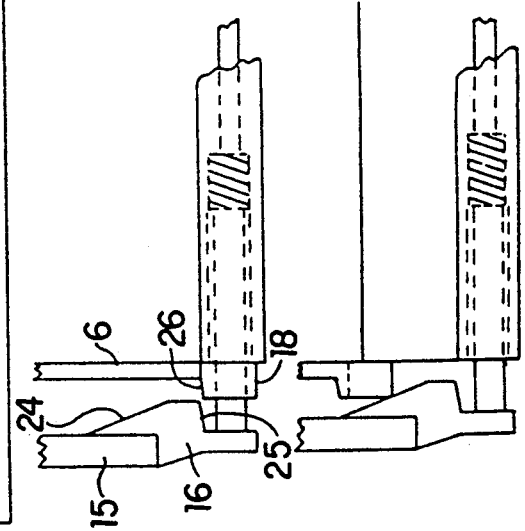

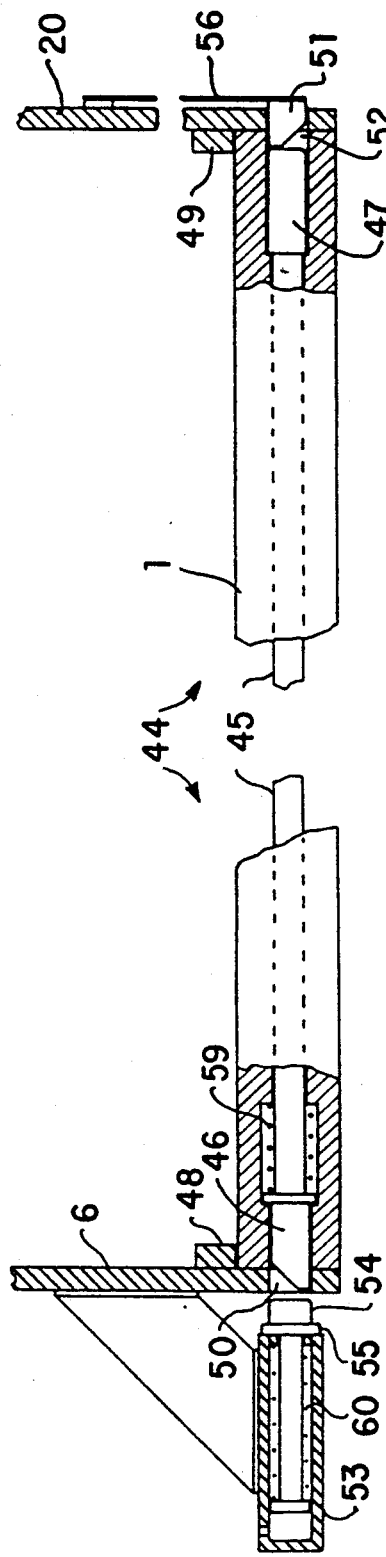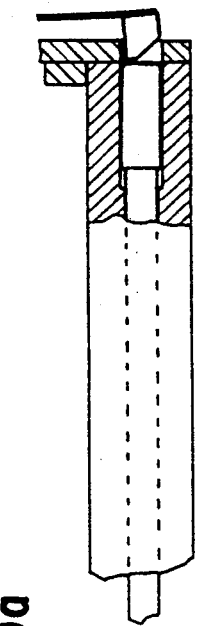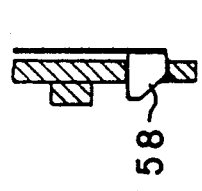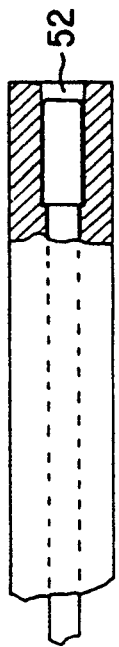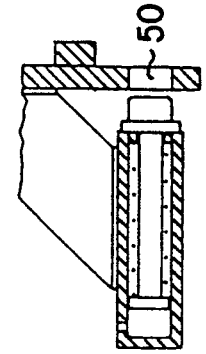
FIG. 9a
FIG. 9b
FIG. 9c

SIDEBOARD CONTROL MECHANISM

TECHNICAL FIELD

The present invention relates to a mechanism for locking and actuating a pivoted sideboard or the like pivotably supported about an axis generally in plane alignment with the associated vehicle floor. An actuating mechanism is secured to a non-pivoted board adjacent to the pivoted sideboard and an actuating member is connected to the pivoted sideboard at a point distant from the axis. A locking mechanism retains the sideboard in the closed position by locking it in both ends to adjacent non-pivoted boards or other means fixed in relation to the vehicle floor.

BACKGROUND ART

In previously known mechanisms of this kind it has been considered necessary to have one actuating mechanism at each end of the pivoted sideboard, and also a separate locking mechanism for each end of the pivoted sideboard. The known mechanisms of this kind do, however, suffer from considerable drawbacks relating to the installation thereof, since the work with installing two separate actuating mechanisms and two separate locking mechanisms, possibly together with the requisite remote-controlling equipment, demands a great effort of highly qualified personnel, which situation is not made more tolerable by the fact that in many cases the work has to be done out-of-doors during inclement weather. As to the functioning, the known mechanisms are relatively vulnerable, especially because one of the actuating mechanisms is placed in a highly exposed position at the rear of the vehicle in question, and both this mechanism, the associated locking mechanism as well as the remote-controlling equipment may easily be damaged under the rough operating conditions often encountered by vehicles of the kind presently referred to, namely during work on building and construction sites.

SUMMARY OF THE INVENTION

According to the invention there is but one actuating mechanism for each pivoted sideboard, that actuating mechanism being placed adjacent to one end of the sideboard. The locking mechanism includes a transmission member which transmits locking and unlocking movements from the one end of the sideboard to the opposite end.

The present invention is based on the recognition of the fact that the pivoted sideboards being used on modern vehicles of the kind presently referred to exhibit such a high torsional rigidity, that they may readily be actuated by means of one single actuating mechanism placed at one of its ends. The novel arrangement of the locking mechanism also makes it possible to place the remote-controlling means for the locking mechanism at the same end of the pivoted sideboard at which the actuating mechanism is situated, and in this way long and vulnerable remote-controlling leads to the opposite end of the pivoted sideboard are avoided.

With the actuating mechanism constructed as a ready made unit it is possible to achieve a further simplification of the installation work, since in many cases it will be sufficient to bolt or weld the mechanism to the part of the vehicle in question and connect the power supply leads and conduits to the vehicle's power supply system. The ready-to-install unit can include the hydraulic pump necessary for the functioning of the mechanism and the electric drive motor for this pump as well as electrically controlled valves for controlling the actuating mechanism and the locking mechanism or mechanisms. The work of making the connecting will solely consist in the connection of a number of electrical wires, which may be simplified further by using multi-contact plugs and sockets. The ready-to-install unit may in certain cases also include the locking mechanism or mechanisms and e.g. the hydraulic conduits for the actuating means for this mechanism or mechanisms.

In an embodiment using a lost motion connection between the actuating mechanism and the pivoted sideboard it is possible to omit special remotely controlled actuating means for the locking mechanism, since in this embodiment the locking mechanism is actuated directly from the actuating mechanism in the initial phase of the latter's opening movement.

In an embodiment with a second vertical position 180° from the closed position it is possible to swing the pivoted sideboard right down to the hanging position. With this arrangement it is possible to avoid that material resting on the pivoted sideboard imposes a strain on the actuating mechanism. Another advantage achieved is that the hanging pivoted sideboard does not come in the way of a fork-lift truck used for placing goods on or removing goods from the vehicle's floor.

In an embodiment where the transmission member is the sideboard itself, it is possible to achieve further simplification of the mechanism, the pivoted sideboard already existing being utilized to transmit the locking and unlocking movements from one end of it to the other. The mutually cooperating locking engagement means may preferably be constructed with a latching effect, the pivoted sideboard for this purpose being spring loaded in the direction of engagement.

BRIEF DESCRIPTION OF THE DRAWINGS

FIGS. 2 to 5 illustrate the procedure during the disengagement and opening movement of a pivoted sideboard, FIG. 9 shows a second exemplary embodiment of the locking mechanism in a mechanism according to the invention.

DESCRIPTION OF PREFERRED EMBODIMENTS

Figure 1:
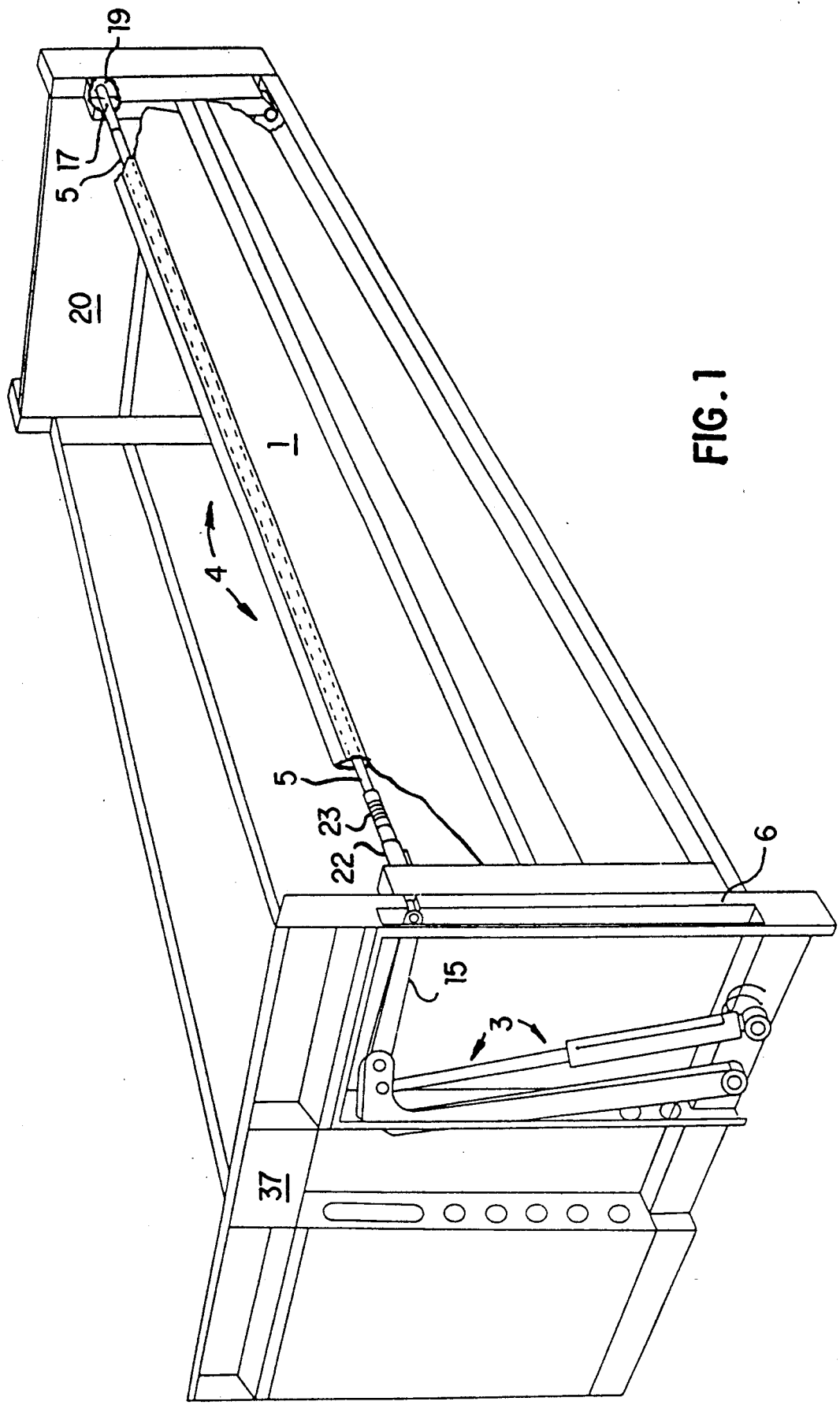
FIG. 1 is an overall perspective view of the mechanism with associated parts of a vehicle load box.

FIG. 1 shows those parts of a load box for a load-carrying vehicle associated with a sideboard 1. At the edge being lowermost in its vertical closed position as shown, the sideboard 1 is pivotably supported about an axis 2 shown in FIG. 2. By means of a hydraulic actuating mechanism 3 the sideboard 1 may be moved from the vertical closing position mentioned towards various other positions, e.g. in which the sideboard is generally horizontal or depends generally vertically from the axis 2. A locking mechanism 4 is adapted to retain the sideboard 1 in the vertical closing position. In the exemplary embodiment shown in FIGS. 1 to 7, the locking mechanism 4 comprises a transmission rod 5, which is adapted to transmit locking and unlocking movements from the end of the sideboard 1 closest to the actuating mechanism 3 to the opposite end of the sideboard. The sole actuating mechanism 3 is situated on a fixed front board 6. In a manner well-known, the complete box shown in FIG. 1 may be adapted to be pivoted in one or a number of directions.

In the exemplary embodiment shown, the actuating mechanism 3 consists of a pivoted arm 7, with a first part 8 thereof pivotably supported about an axis 9, and with a second part 10 thereof being set at an angle relative to the first part 8 and having two joint bearings 11 and 12, a double-acting actuating cylinder 13, the cylinder end of which is pivotably supported about an axis 14, while its piston end is connected to the second part 10 of the pivoted arm 7 through the joint bearing 11, an actuating rod 15, with one of its ends being connected to the second part 10 of the pivoted arm 7 through the joint bearing 12, and with its other end being secured to one end of the transmission rod 5, as well as control and sensing means (not shown).

The locking mechanism 4, seen especially in FIGS. 2b, 3b and c, and FIGS. 6 and 7, consists of the above-mentioned transmission rod 5, at its end pointing to the left in FIG. 2b being secured to the actuating rod 15 through a latch block 16, and at its end pointing to the right in FIG. 2b being shaped in the form of a locking bolt 17, a catch (18), which is secured to the front board 6 and adapted to cooperate with the latch block 16 in a manner to be explained below, a locking-bolt bush 19, which is secured to a fixed member at the end lying to the right in FIG. 2b, e.g. a rear board 20, and which is adapted to cooperate with the locking-bolt portion 17 of the transmission rod 5 in a manner to be explained below, a double-acting actuating mechanism consisting of a single-acting hydraulic actuating cylinder 22, which is adapted to move the transmission rod 5 from the right to the left in FIGS. 2b, 3b, 3c, 6 and 7, against the force from a spring 23 permanently acting upon the transmission rod in a direction in which its locking-bolt portion 17 is maintained in engagement with the locking-bolt bush 19 secured to the rear board 20, as well as connecting means, control means and possibly sensing means (not shown) for the actuating cylinder 22 and-/or components being actuated by same.

In the position of rest, shown in FIG. 2, the sideboard 1 is in its vertical closing position and is locked in this position by the locking mechanism 4, both the cylinder 13 and the cylinder 22 are in their non-actuated state, i.e. the pressure difference across their pistons is insignificant or zero. When the sideboard 1 is to be opened by swinging outwards about the axis 2 in a clockwise direction as viewed in FIG. 2a, pressure is supplied to the cylinder 22 by means of the control means (not shown), so that the cylinder 22 moves the transmission rod 5 against the force of the spring 23 to the left in FIG. 2b, by which the latch block 16 is disengaged from the catch 18, and at the same time the bolt 17 is pulled out of the bolt bush 19. At this stage the sideboard 1 is free to be moved outwards by contracting the cylinder 13, so that the arm 7 is turned clockwise in FIG. 2a and thus moves the actuating rod 15 and the upper part of the sideboard 1 towards the right in FIG. 2a. This movement may be continued as far as desired in each case, e.g. to the horizontal position shown in FIG. 4 or the depending vertical position shown in FIG. 5. It will be seen especially from FIG. 5 that the angular shape of the pivoted arm 7 contributes to making the movement to the depending position shown in FIG. 5 possible.

Figure 5:
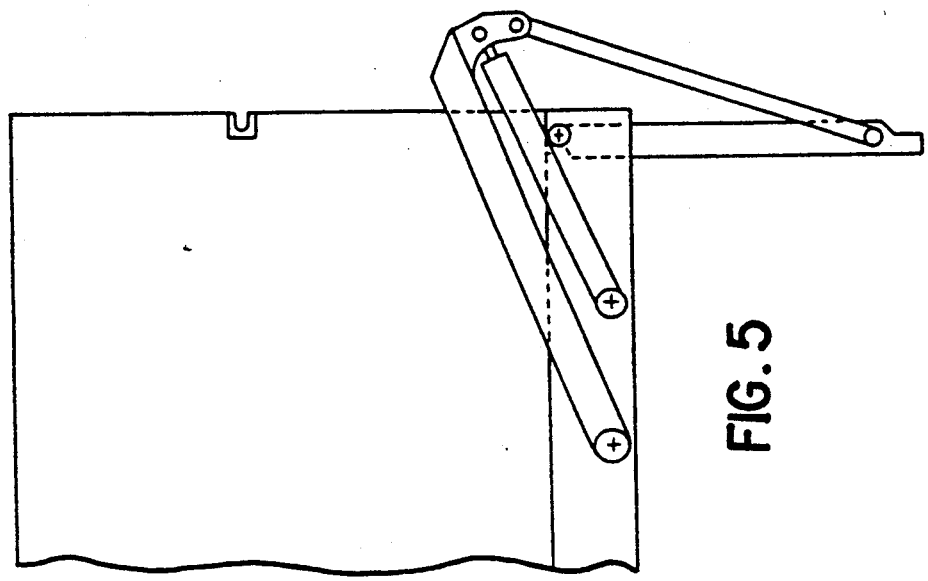
Figure 4:
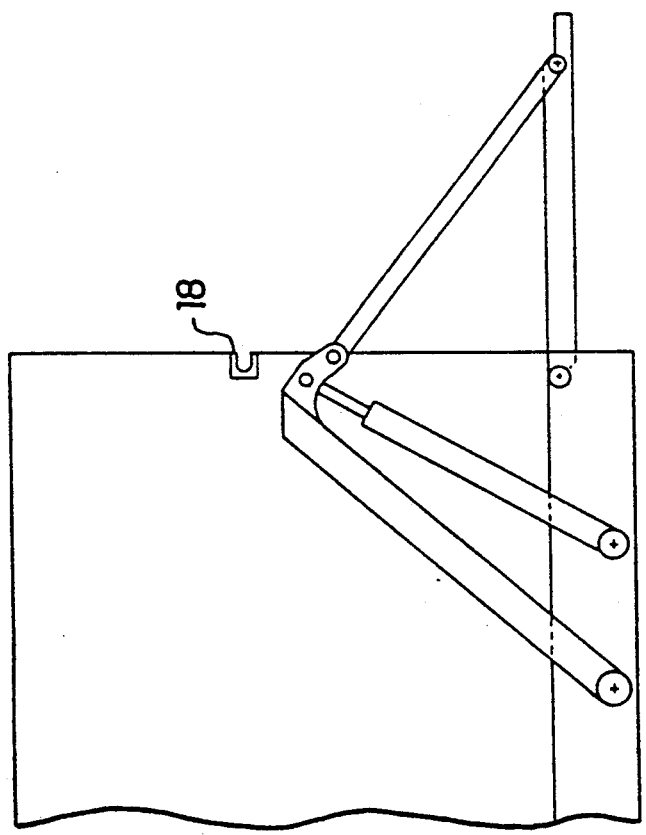

As will be seen from FIGS. 3b and c as well as FIGS. 4 and 5, the catch 18 is shaped like a reclining U with the open side facing outwards, so that the part of the transmission rod 5 being connected to the latch block 16 may be moved into and out of engagement with the catch 18.

When the sideboard 1 has been moved outwardly to such an extent that the latch block 16 has been disengaged from the catch 18, the pressure in the cylinder 22 is released, whereupon the spring 23 moves the transmission rod 5 towards the right in FIGS. 3b and c.

The latch block 16 comprises a ramp 24 which as shown in FIGS. 2b, 3b, 3c and 6 extends at an oblique angle away from the center and axis of the transmission rod 5. When the sideboard 1 is moved from an open position to the closed position shown in FIG. 2 by means of the actuating mechanism 3, i.e. by actuating the cylinder 13 in a direction opposite to the previous one, the ramp 24 on the latch block 16 will during the terminal phase of the closing movement—vide FIGS. 3c and 3b respectively—cause the latch block 16 to move towards the left in FIG. 3c and then—see FIGS. 3b and 2c respectively—move slidingly past the catch 18 and snap in behind same to the locking position shown in FIGS. 2b. The latch block 16 and the catch 18 comprise mutually cooperating slightly oblique locking engagement surfaces 25 and 26 respectively, which provide a wedge action and thus prevent lost motion between these two components. During the terminal phase of the closing movement, during which the transmission rod 5 is moved from the right towards the left in FIGS. 3c and 3b respectively, the locking bolt portion 17 of the transmission rod 5 is also retracted to such an extent that it can pass the outermost part of the locking bolt bush 19 without hindrance and then—as seen in FIG. 2b—snap into same at the same time as the latch block 16 snaps in behind the catch 18. At this point it should be observed that during the closing movement it is not necessary to actuate the cylinder 22 of the locking mechanism 4.

Figure 6:
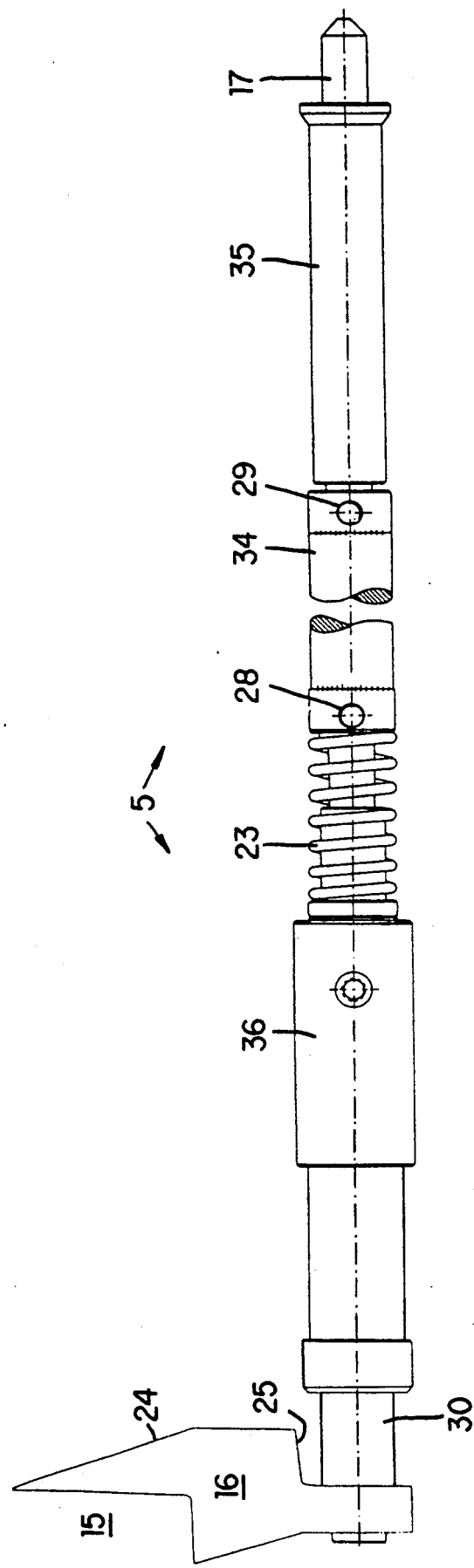
FIGS. 6 and 7 show details of the locking mechanism in the mechanism shown in FIGS. 1 to 5, in elevation and longitudinal section respectively.
Figure 7:
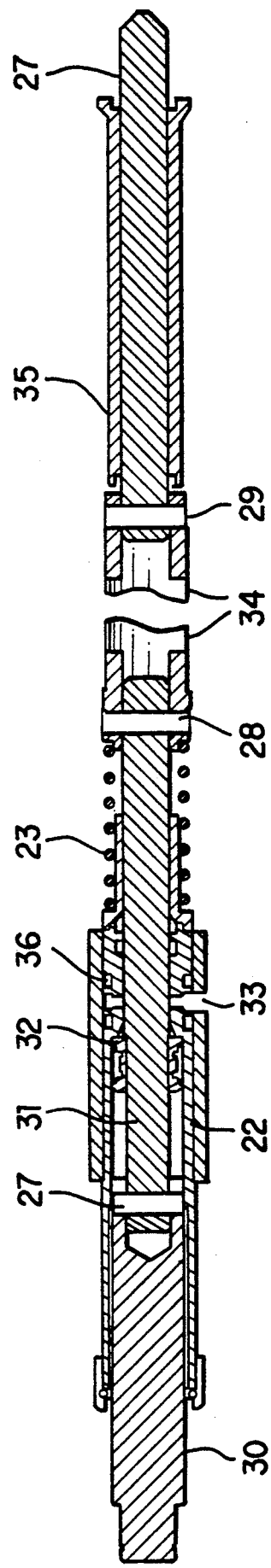

An example of the more detailed construction of the transmission rod 5 and the means cooperating therewith is shown in FIGS. 6 and 7. The rod 5 is divided into four mutually connected parts by means of three articulation axes 27, 28 and 29, viz.—as taken from the left towards the right in FIGS. 6 and 7— a latch block carrier 30, which is connected to the actuating rod 15 not shown in FIG. 6 to the latch block 16 shown only in FIG. 6, a piston rod 31 for the piston 32 movable in the actuating cylinder 22, the right hand side of which piston may be acted upon by pressure fluid introduced through a bore 33, said rod 31 in its end facing towards the right in FIGS. 6 and 7 cooperating with the spring 23 referred to above in the manner likewise referred to above, a connecting piece 34, as well as the above-mentioned locking bolt 17 being slidable in a slide bush 35, which together with a support bush 36 enclosing and supporting the actuating cylinder 22 is secured to the sideboard 1 at the edge of same being uppermost in the closing position, in a manner not shown.

Figure 8B:
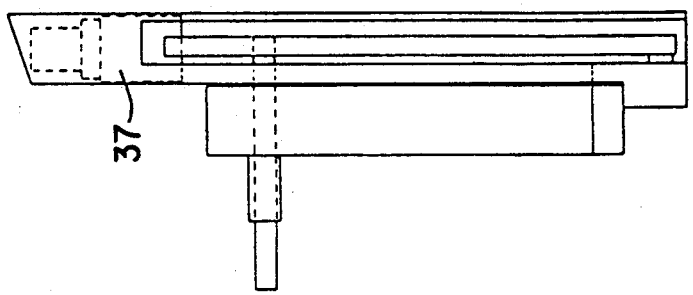
FIG. 8 shows a ready-to-install unit constructed from two actuating mechanisms of the type shown in FIGS. 1 to 5 together with associated power supply equipment.
Figure 8A:
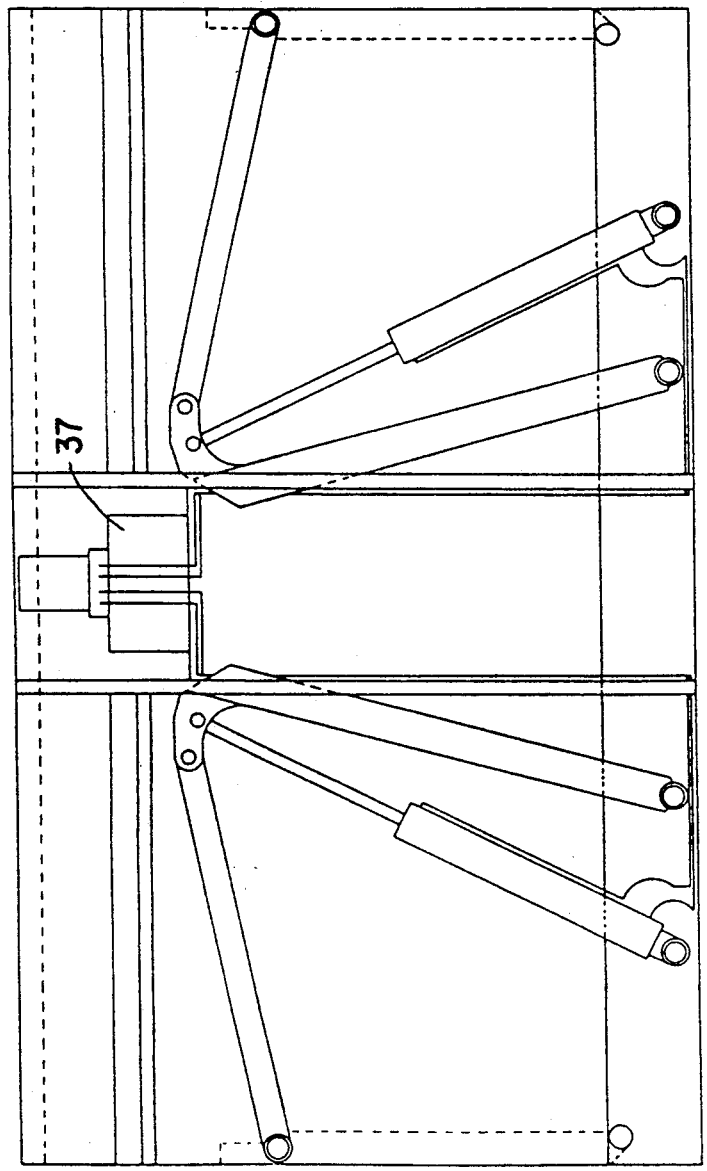
Figure 8C:
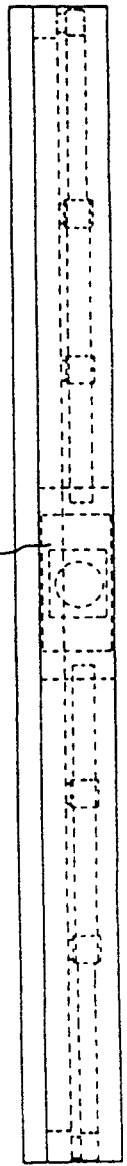

FIG. 8 shows how two mechanisms may be situated symmetrically with one on each side of a load box, while a control unit 37 is placed on the front board 6 between the two actuating mechanisms 3. The control unit 37 in a manner known but not shown contains the requisite power supply and control means, that are connected, partly to the actuating cylinders 13 and 22, partly to the mechanism's sensors (not shown) for indicating the state and position of the mechanism and/or the sideboard 1, and partly to the requisite power supply and remote-control leads and conduits, all through suitable hydraulic and electrical conduits and conductors. The equipment shown in FIG. 8 may preferably be constructed in the form of a complete unit ready for mounting on a front board, further installation work solely comprising placing the transmission rods 5 on or in the sideboards 1 and placing the locking bolt bushes 19 on or in e.g. the rear board, as well as laying any requisite hydraulic and/or electrical conduits and leads.

FIGS. 9a, b and c show in a manner roughly corresponding to FIGS. 2b, 3b and 3c a second exemplary embodiment of the locking mechanism, in this case bearing the reference number 44. In the same manner as the locking mechanism 4 referred to above, the locking mechanism 44 comprises a transmission rod 45, in its end pointing left in FIG. 9 being permanently connected to a latch bolt 46, and with its end pointing towards the right in FIG. 9 being permanently connected to an ejector 47.

The sideboard 1, the inward movement of which is limited by two stops 48 and 49 or equivalent means, is locked against outward movement in the position shown in FIG. 9a, partly by the engagement of the latch bolt 46 with an aperture 50 in the front board 6, partly by the engagement between a latch bolt 51 resiliently supported on the rear board 20 and the bore 52, in which the ejector 47 is slidably supported. When the sideboard 1 is to be moved from the position shown in FIG. 9a to the one shown in FIG. 9c, an actuating cylinder 53 secured to the front board 6 is actuated to push an ejector 54 secured to its piston rod into the aperture 50 and thereby press the latch bolt 46 back until the ejector 54 with a collar 55 abuts against the front board 6 (or a fitting secured thereto).

This action disengages the latch bolt 46 from the aperture 50, so that it no longer constitutes a hindrance for moving the sideboard 1 outwards. Simultaneously with the movement of the latch bolt 46 from the position shown in FIG. 9a to the one shown in FIG. 9b the ejector 47 is moved to a position, in which its end surface pointing towards the right in the Figure is aligned with the end surface on the sideboard 1 (or on a corresponding fitting), by which the latch bolt 51 supported by a leaf spring 56 is pressed out of its locking engagement. The sideboard 1 may now be moved from the position shown in FIG. 9b to the one in FIG. 9c and further to positions corresponding e.g. to the ones shown in FIGS. 4 and 5 by means of the actuating mechanism 3 not shown in this Figure (or an equivalent actuating mechanism).

The actuating cylinder 53 is in a manner corresponding to that of the above-mentioned actuating cylinder 22 adapted to be controlled in coordination with the actuating mechanism 3 substantially in the manner referred to above. Thus, when the sideboard 1 is to be moved from the open position shown in FIG. 9c to the closed position shown in FIG. 9a, it is not necessary to actuate the cylinder 53, since the two latch bolts 46 and 51 are pressed back during the movement towards the closed position in the same manner as the latch bolt in an ordinary door lock. For this purpose, the latch bolts 46 and 51 have oblique ramps 57 and 58 respectively. The transmission rod 45 is returned to the position shown in FIG. 9a by means of a spring 59, permanently urging the rod towards the left in FIG. 9.

FIG. 9 is purely diagrammatic, and thus this figure does not show any requisite means to ensure that the end of the ejector 47 facing right in FIG. 9 is precisely aligned with the end surface of the sideboard 1 when the ejector 54 has pressed the latch bolt 46 out of engagement as shown in FIG. 9b. Such an alignment could be ensured by placing mutually cooperating abutment means on the ejector 47 and the right hand end of the sideboard 1 for ensuring the correct alignment position, by making the transmission rod 45 slightly resilient in the longitudinal direction, and by shaping the latch block 47 and the means cooperating therewith in such a manner, that the extent of the movements of the latch block 46 from the locking position to the release position shown in FIG. 9b is somewhat greater than the requisite movement of the ejector 47. By this arrangement, when the latch bolt 46 is pressed back by the ejector 54, the transmission rod 45 will first move the ejector 47 into abutment in the correct alignment position, whereupon any further movement of the latch bolt 46 will be taken up by the resiliency of the transmission rod 45 (such an arrangement is not shown in the drawings, but persons skilled in the art will be able to construct the requisite mechanisms without further guidance).

Normally, the ejector 54 is held in the position shown in FIG. 9a by a spring 60 placed inside the cylinder 53, so that the cylinder 53 may be constructed as a single-acting cylinder.

It is also within the scope of the present invention to let the actuating cylinder 13 serve both the actuating mechanism 3 and the locking mechanism 4 or 44 according to a known principle. For this purpose the actuating rod 15 of the actuating mechanism 3 may be connected to the sideboard 1 through a lost-motion mechanism (not shown), which in the initial phase of the movement of the cylinder 13 actuates the locking mechanism 4 or 44 respectively to move the transmission rod 5 or 45 respectively towards the left in FIG. 2b or towards the right in FIG. 9a respectively, after which stage further movement of the cylinder 13 will be transmitted to the sideboard 1 for moving same outwardly from the vertical closing position shown in FIG. 2.

A further possibility (not shown) consists in letting the sideboard itself constitute the transmission member for transmitting locking and unlocking movements from that end of the sideboard, where the actuating mechanism is situated, to the opposite end of the sideboard. Such an embodiment may e.g. be realized by letting the sideboard be both pivotably and longitudinally translatably supported on hinges corresponding to the axis 2 in FIG. 2a and by constructing mutually cooperating locking engagement means on the two ends of the sideboard and the adjacent parts of the front and back boards, said engagement means being arranged in such a manner that a longitudinal movement of the sideboard in one direction causes unlocking, while a longitudinal movement in the opposite direction causes locking engagement. In the same manner as the parts of the locking mechanism described above, the said mutually cooperating locking engagement means be arranged in such a manner, that they enable a latching effect to take place when the sideboard is being closed, the sideboard for this purpose possibly being spring-loaded in the direction of the latter longitudinal direction, i.e. the locking direction.

I claim:

1. A mechanism for locking and actuating a vehicle sideboard or the like relative to a vehicle floor, said sideboard having a pair of opposed ends and being pivotably supported about an axis generally in plane alignment with the vehicle floor, said mechanism comprising
   (a) a sole actuating mechanism for pivoting said sideboard between a closed position and an open position, said actuating mechanism being fixed relative to said vehicle floor adjacent to one end only of the pivoted sideboard and having a first actuating member connected to said one end of the pivoted sideboard at a point distant from said axis, and
   (b) a locking mechanism which retains the pivoted sideboard in the closed position by locking it at both ends relative to said vehicle floor, said locking mechanism comprising transmission means operatively connected to said sole actuating mechanism for producing locking and unlocking movements and for transmitting locking and unlocking movements thus produced from said one end of the pivoted sideboard to the opposite end of the pivoted sideboard.

2. A mechanism according to claim 1 wherein
   (a) the transmission means consists of a rod slidable in the longitudinal direction of the pivoted sideboard, said rod having at said opposite end of the pivoted sideboard a locking bolt urged by a spring towards locking engagement with a locking-bolt bush fixed with respect to said vehicle floor, the end of said rod positioned at the one end of the pivoted sideboard being connected to a latch block with a ramp facing the center of the rod, said latch block in the closed position of the pivoted sideboard being urged by said spring into engagement with a catch fixed with respect to said vehicle floor.
   (b) the latch block being connected to the first actuating member being movable parallel to the longitudinal direction of the rod to a sufficient extent that the locking bolt can be moved out of engagement with the locking-bolt bush and the latch block can be moved out of engagement with the catch, and
   (c) the rod is connected to a second actuating member, by means of which it may be moved against the force exerted by said spring, whereas
   (d) the actuating mechanism and the second actuating member are controlled in such a manner, that when the pivoted sideboard is to be moved from the closed position to the open position, the second actuating member is first actuated until the rod has moved the latch block and the locking bolt out of locking engagement with the catch and the locking-bolt bush respectively, whereupon the actuating mechanism of the pivoted sideboard is actuated to move the pivoted sideboard to the open position, and that when the pivoted sideboard is to be moved from the open position to the closed position, only the actuating mechanism for the pivoted sideboard is actuated to move the pivoted sideboard to the closed position, whereas
   (e) the second actuating member is arranged so it does not prevent longitudinal movement of the rod caused by the engagement between the ramp on the latch block and the catch during the terminal phase of the closing movement.

3. A mechanism according to claim 2, wherein the second actuating member is constituted by a pressure fluid cylinder.

4. A mechanism according to claim 3, wherein the pressure fluid cylinder is placed so that its piston rod constitutes a part of the transmission rod.

5. A mechanism according to claim 1, wherein
   (a) the transmission member consists of a rod having an end positioned at the one end of the pivoted sideboard and fixedly connected to a first latch bolt which in the locking position of the rod is held in engagement with a first aperture fixed with respect to said vehicle floor by a spring acting on said rod, said rod in its opposite end being connected to a second ejector adapted to cooperate with a second latch bolt resiliently connected with respect to said vehicle floor, said second latch bolt in the locking position engaging a second aperture fixed with respect to said pivoted sideboard, and
   (b) that the actuating means of the locking mechanism adapted for the unlocking movement thereof comprise a first ejector slidably supported in means connected to said vehicle floor, said first ejector being adapted to penetrate sufficiently far into the first aperture to unlock the first latch bolt from the first aperture, whereas
   (c) the rod is arranged and dimensioned so that when the first ejector has entered the first aperture, the second ejector has simultaneously moved out of the second aperture to such an extent, that it unlocks the second latch bolt from the second aperture.

6. A mechanism according to claim 5, wherein the first ejector is connected to the piston rod in an actuating cylinder and comprises an abutment for limiting its depth of penetration.

7. A mechanism according to claim 1, wherein actuating mechanism is constructed as a unit for mounting on a board fixed with respect to said vehicle floor.

8. A mechanism according to claim 1 wherein the actuating mechanism for each pivoted sideboard moves the pivoted sideboard between the substantially vertical closed position and at least one position substantially 180° therefrom.

* * * * *